ated Feb. 28, 1961

2,973,259
METHOD FOR KILLING WEEDS AND WOODY BRUSH

Max T. Goebel, Chadds Ford, Pa., assignor to E. I. du Pont de Nemours and Company, Wilmington, Del., a corporation of Delaware No Drawing. Filed Sept. 26, 1958, Ser. No. 763,469

4 Claims. (Cl. 71—2.7)

This invetnion relates to herbicidal compositions and methods employing at least one of the trialkylamine-sulfur trioxide adducts of the formula:

(1) $\quad R_1R_2R_3N \cdot SO_3$ wherein $R_1$, $R_2$ and $R_3$ are alkyl groups of from 1 to 4 carbons inclusive.

Compounds of Formula 1 can be prepared by following the teachings of Moede and Curran, in J. Am. Chem. Soc., 71, 852 (1949), or Lecher, in U.S. Patent No. 2,386,693 (1945). Some compounds of Formula 1, for example, trimethylamine-sulfur trioxide and triethylamine-sulfur trioxide, are commercially available.

It has now been discovered that tertiary amine-sulfur trioxide adducts of the type described have surprising and unexpected phytotoxic properties. These compounds have outstanding broad herbicidal activity. Because these compounds hydrolyze to the respective amine and sulfuric acid very slowly, the phytotoxic principle is in the adducts themselves. The adducts are easy to handle and are not corrosive like sulfuric acid. In addition, they are cheap and readily available and can be applied by the use of standard application procedures and conventional dusting or spraying equipment.

Preferred adducts for use in the compositions and methods of this invention are trimethylamine-sulfur trioxide and triethylamine-sulfur trioxide.

The rate of application of trialkylamine-sulfur trioxide adducts will vary with the particular plant pest involved, the formulation used, the mode of application, prevailing weather conditions, plant density and the like. Since many variables play a role, it is not possible to indicate generally the rate of application suitable for all situations. Certain particular usage rates that are generally found effective can be indicated but it must be understood that the determining of the proper rate in any given instance is conventional procedure to those skilled in the art.

Thus, for example, the compounds can be used as contact herbicides to destroy undesirable weeds and as temporary soil sterilants when applied at the rate of from about 30 to 375 pounds active agent per acre. They can be used to control annual weeds in crops such as cotton, asparagus and sugar cane by pre-emergence or directed post-emergence applications when applied at rates of from about 5 to 50 pounds of active ingredient per acre.

They can be used for the control of undesirable brush, such as poison ivy, poison oak, willow, beech, gum, elm, ash, and oak, when applied as spray applications at rates of from about 75 to 375 pounds of the active agent per acre. Alternatively, these compounds can be used to kill trees or prevent regrowth from stumps when applied by the "frilling" method, a process whereby the bark and sapwood of a tree is notched or gashed and the active herbicidal agent is placed in the formed cups. Such an application technique facilitates more rapid and complete translocation of the herbicide by plant tissues and hastens death of leaves and/or roots.

These compounds when used as foliage sprays have been observed to instigate plant tissue kill on herbaceous weeds by a burning action. Upon application to woody plants, they cause a somewhat slower kill of the undesirable brush which appears to be related to a gradual translocation and kill of the roots. The rate of kill varies according to the type of plant treated. The exact cause of death is not understood completely in all cases.

It is much preferred to formulate the compounds with conventional pest control adjuvants, modifiers or diluents, hereinafter generically called inert carriers, because handling is facilitated and herbicidal action thereby is frequently enhanced. Such herbicidal compositions or formulations are prepared in the form of either powdered solids or liquids.

The liquid compositions, whether solutions or dispersions of trialkylamine-sulfur trioxide adducts in liquid solvent, and also the wettable powders, contain as a conditioning agent one or more surface active agents in amounts sufficient to render a given composition containing a trialkylamine-sulfur trioxide compound readily dispersible in water or in oil. By the term "surface active agent," it is understood that wetting agents, dispersing agents, suspending agents and emulsifying agents are included.

Suitable surface active agents are set out, for example, in Searle U.S. Patent No. 2,426,417, Todd U.S. Patent No. 2,655,447, or Jones U.S. Patent No. 2,412,510 or in Lenher et al. U.S. Patent No. 2,139,276. A detailed list of such agents is set forth in an article in "Soap and Chemical Specialties," vol. 31, No. 7, pages 50–61, No. 8, pages 48–61; No. 9, pp. 52–67, and No. 10, pages 38–67 (1955). See also McCutcheon in "Chemical Industries," November 1947, page 8011, entitled "Synthetic Detergents;" and Bulletin E-607 of the Bureau of Entomology and Plant Quarantine of the U.S. Dept. of Agriculture. In general less than 10% by weight of surface active agent is present in the compositions containing trialkylamine-sulfur trioxides, and the amount of surface active agent in the compositions may be as low as 1% by weight or even less.

Powdered or dust compositions of the invention, whether or not also modified with a surface active agent, are prepared by admixing a trialkylamine-sulfur trioxide adduct with finely divided inert solid carriers. Such carriers are preferably talcs, natural clays, pyrophyllite, diatomaceous earth, and flours such as walnut shell, wheat, redwood, soya bean and cotton seed flours. Other inert solid carriers which can be used include magnesium and calcium carbonates, calcium phosphates, sulfur, lime, etc., either in powder or granular form. The percentage by weight of trialkylamine-sulfur trioxide will vary according to the manner in which the composition is to be applied but, in general, will be from about 0.5 to 95% by weight of the herbicidal composition.

Herbicidal compositions containing a trialkylamine-sulfur trioxide adduct may also be prepared by dispersing these compounds in an inert non-aqueous carrier. Aliphatic and aromatic hydrocarbons, for example, hydrocarbons of petroleum origin, are preferred as carriers. These dispersions are prepared by milling the trialkylamine-sulfur trioxide adduct with dispersing agents and suspending agents and the inert carrier in mills such as pebble mills. The amount of the herbicide in the dispersion may be from 10% or less to 40 or 50% of the oil dispersion.

Adhesives such as gelatin, blood albumin, resins, for example, rosin, alkyd resins and the like, can also be used in certain compositions to increase retention or tenacity of deposits following application.

In order that the invention may be better understood, the following examples are given in addition to the examples already given above. The examples illustrate typical herbicidal compositions of the invention, methods for their preparation, herbicidal applications and the results obtained. The numbers following the tabulated ingredients represent parts by weight of the ingredients in the respective compositions.

Example 1

*Dust formulations.*—The following compositions are adapted for direct application as dusts for the prevention or destruction of undesirable plants. They can be prepared by first blending and micropulverizing the active material with the minor diluent and then blending this mix with the major diluent. The compositions usually have an average particle size less than about 50 microns and can be used with conventional dusting equipment.

A

| | |
|---|---|
| Trimethylamine-sulfur trioxide | 10 |
| Attapulgite | 10 |
| Micaceous talc | 80 |

This dust composition is applied at the rate of 150 lbs./acre of active ingredient with a hand-operated duster to a mixture of undesirable grasses and broadleaf weeds, such as crabgrass, foxtail, barnyard grass, pigweed, ragweed, and lambs' quarter. Good control of these weeds is obtained.

B

| | |
|---|---|
| Triethylamine-sulfur trioxide | 20 |
| Diatomaceous silica | 20 |
| Pyrophyllite | 60 |

This composition is applied to an area under cyclone fences at the rate of 120 pounds active ingredient per acre. It kills both broadleaf weeds and grasses including ragweed, barnyard grass, crabgrass, pigweed and other unwanted plants.

Example 2

*Water dispersible powders.*—The following powdered compositions are suitable for forming aqueous dispersions useful for spray application. The components are first blended together in a ribbon blender or other conventional mixing or blending equipment and then are micropulverized until substantially all the particles are below 50 microns. A final reblending of components can be carried out.

A

| | |
|---|---|
| Trimethylamine-sulfur trioxide | 80 |
| Synthetic fine silica | 15 |
| Lignin sulfonic acid, Na salt | 4 |
| Polyoxyethylene modified sorbitan monolaurate | 1 |

This formulation is extended with 100 gallons of water and applied at the rate of 35 lbs./acre of active ingredient as a pre-emergence treatment for control of miscellaneous annual broadleaf and grass species in asparagus. Good control of the weed species is noted with minimum injury to the crop.

A similar rate applied as a directed post-emergence treatment in weeds in established sugar cane gives excellent control of a heavy infestation of annual broadleaf weeds with minimum injury to the sugar cane.

This formulation is also used for the control of "sprouts" (regrowth) on stumps and to kill intact trees.

B

| | |
|---|---|
| Triethylamine-sulfur trioxide | 50 |
| Attapulgite | 47 |
| Alkyl naphthalene sulfonic acid, Na salt | 1 |
| Naphthalene sulfonic acid-formaldehyde condensation product, Na salt | 2 |

This formulation is used for the control of "sprouts" (regrowth) on stumps and to kill intact trees. The tree or stump is "frilled"—cups notched into the tree every 4 to 6 inches with an ax—and 20 grams of active ingredient are applied per "frill." Excellent control of "sprouting" on stumps and kill of such trees as sweet gum, elm, willow, and ash are obtained.

Example 3

The following composition is prepared by mixing the components and grinding the insoluble active material in a pebble mill, or other similar device until the herbicide particles are substantially all smaller than about 5 microns. The product can be emulsified in water or diluted with additional oil to spray concentration.

| | |
|---|---|
| Trimethylamine-sulfur trioxide | 30 |
| Diesel oil | 65 |
| Mixed polyoxyethylene ethers and oil soluble petroleum sulfonates | 5 |

The above formulation is emulsified in water and applied as a foliage spray at a rate of 75 lbs./100 gallons water (total of 375 pounds of active ingredient applied per acre) to an infestation of mixed brush along a railroad right-of-way. Excellent control of poison oak, poison ivy, sweet gum, and willow is obtained.

Example 4

| | Percent |
|---|---|
| Tri-(n-propyl)amine-sulfur trioxide | 50 |
| Oil soluble sodium petroleum sulfonate | 5 |
| Diatomaceous silica | 45 |

The above composition is prepared by blending and grinding the components until the particles are substantially all below 50 microns. The resulting powder may be dispersed in water and sprayed or it may be stirred into oil to yield an oil dispersion which may be sprayed directly.

This formulation is dispersed in water and applied as a foliage spray at a rate of 65 lbs./100 gallons water. It is applied with a truck-mounted pressure sprayer to an infestation of seedling brush and annual weeds around industrial sites. At a rate of 350 lbs./acre of active ingredient good control of weeds is obtained.

Example 5

| | Percent |
|---|---|
| Tri-(n-propyl)-amine-sulfur trioxide | 25 |
| Herbicidal weed oil | 67 |
| Alkyl aryl polyether alcohol | 8 |

The components are mixed and ground in a pebble mill or sand mill until the active material is reduced in particle size to a maximum of about 10 microns.

The product may be diluted further with oil and sprayed or it may be diluted with water to form an emulsion containing the amine-$SO_3$ complex suspended in the oil. It is applied at a rate of 75 lbs./acre of active ingredient to control an infestation of annular weeds and brush along a railroad right-of-way.

Example 6

| | |
|---|---|
| Tri-(n-butyl)-amine-sulfur trioxide | 50 |
| Alkyl naphthalene sulfonic acid, Na salt | 1 |
| Sodium lignin sulfonate | 1 |
| Kaolin clay | 48 |

The above composition is prepared by blending the components and micropulverizing until substantially all the particles are below 50 microns. The resulting powder may be dispersed in water and sprayed.

This formulation is extended with 100 gallons of water and applied at the rate of 45 lbs./acre of active ingredient as a pre-emergence treatment for control of annual broadleaf weed species in a field of asparagus. Good control of weeds is obtained without injury to the crop.

Example 7

| | |
|---|---|
| Tri-(n-butyl)amine-sulfur trioxide | 25 |
| Diesel oil | 67 |
| Tall oil-ethylene oxide condensation product | 8 |

This composition is prepared by milling the components together until the amine-SO₃ adduct is reduced to a particle size of about 5 microns. The resulting dispersion may be extended further with oil or emulsified in water for application.

When extended with diesel oil and sprayed at a rate of 150 lbs./acre of active ingredient, this formulation gives good weed control around oil storage tanks for an extended period. It is particularly effective for desiccating annual weeds.

*Example 8*

| | |
|---|---|
| n-Butyldimethylamine-sulfur trioxide | 20 |
| Herbicidal weed oil | 73 |
| Alkyl aryl polyether alcohol | 7 |

The components are mixed and ground in a pebble mill until the active material is reduced in particle size to a maximum of about 10 microns.

The product may be diluted with water to form an emulsion. It is applied at the rate of 120 lbs./acre of active ingredient to control both broadleaf and grass weeds around industrial sites.

*Example 9*

| | |
|---|---|
| n-Butyldiethylamine-sulfur trioxide | 75 |
| Synthetic fine silica | 20 |
| Lignin sulfonic acid, Na salt | 4 |
| Polyoxyethylene modified sorbitan monolaurate | 1 |

The components are first blended together in a ribbon blender or other conventional mixing equipment and then are micropulverized until substantially all the particles are below 50 microns. The mixture is then extended with water.

This formulation may be used at a rate of 70 lbs. per 100 gallons water (total of 350 lbs. of active ingredient applied per acre) to infestations of mixed brush. Good control of poison oak and poison ivy is obtained.

This application is a continuation-in-part of my application Serial No. 688,104, filed October 4, 1957, now abandoned.

The claims are:

1. A method for killing weeds which comprises applying to a locus to be protected in an amount sufficient to exert herbicidal action at least one trialkylamine-sulfur trioxide adduct of the formula $R_1R_2R_3N \cdot SO_3$ wherein $R_1$, $R_2$, and $R_3$ are alkyl groups of from 1 to 4 carbons inclusive.

2. A method for the killing of woody brush which comprises applying to such brush a herbicidal amount of at least one trialkylamine-sulfur trioxide adduct of the formula $R_1R_2R_3N \cdot SO_3$ wherein $R_1$, $R_2$, and $R_3$ are alkyl groups of from 1 to 4 carbons inclusive.

3. A method for the destruction and prevention of weeds which comprises applying in amount sufficient to exert herbicidal action at least one of the group of trimethylamine-sulfur trioxide and triethylamine-sulfur trioxide.

4. A method for the destruction and prevention of woody brush which comprises applying to such brush a herbicidal amount of at least one of the group of trimethylamine-sulfur trioxide and triethylamine-sulfur trioxide.

References Cited in the file of this patent

UNITED STATES PATENTS 2,732,393    Hardy _____ Jan. 24, 1956

OTHER REFERENCES

Scalera et al. in "Chemical Abstracts," 1952, vol. 46, col. 3526(c).

Meriel in "Chemical Abstracts," 1954, vol. 48, col. 11868(f).